United States Patent

Shimizu

[11] Patent Number: 6,092,012
[45] Date of Patent: Jul. 18, 2000

[54] POWER STEERING DEVICE

[75] Inventor: Yoshinobu Shimizu, Sakai, Japan

[73] Assignee: Koyo Seiko Co., Ltd., Osaka, Japan

[21] Appl. No.: 09/284,875

[22] PCT Filed: Aug. 24, 1998

[86] PCT No.: PCT/JP98/03752

§ 371 Date: Apr. 22, 1999

§ 102(e) Date: Apr. 22, 1999

[87] PCT Pub. No.: WO99/10218

PCT Pub. Date: Mar. 4, 1999

[30] Foreign Application Priority Data

Aug. 26, 1997 [JP] Japan .................................. 9-229841

[51] Int. Cl.$^7$ .............................. B62D 12/00; G06F 7/00
[52] U.S. Cl. .................... 701/41; 701/72; 74/473.31; 74/484 R; 180/6.44; 180/6.5; 180/422; 180/429; 180/416
[58] Field of Search .................... 701/41, 72; 74/388 PS, 74/412 TA, 473.31, 484 R; 180/6.2, 6.28, 6.44, 6.5, 412, 413, 416, 429, 433, 421, 422, 423

[56] References Cited

U.S. PATENT DOCUMENTS

| | | | |
|---|---|---|---|
| 5,279,380 | 1/1994 | Frank et al. | 180/141 |
| 5,508,929 | 4/1996 | Harada | 701/48 |
| 5,904,222 | 5/1999 | Liubakka et al. | 180/422 |
| 5,921,335 | 7/1999 | Straetker | 180/6.44 |
| 5,927,430 | 7/1999 | Mukai et al. | 180/446 |
| 5,941,338 | 8/1999 | Miller et al. | 180/421 |
| 5,948,029 | 9/1999 | Straetker | 701/41 |

FOREIGN PATENT DOCUMENTS

| | | |
|---|---|---|
| 5-238410 | 9/1993 | Japan . |
| 6-16144 | 1/1994 | Japan . |
| 6-16145 | 1/1994 | Japan . |
| 6-144268 | 5/1994 | Japan . |
| 6-206554 | 7/1994 | Japan . |

Primary Examiner—William A. Cuchlinski, Jr.
Assistant Examiner—Olga Hernandez
Attorney, Agent, or Firm—Rabin & Champagne, PC

[57] ABSTRACT

A power steering apparatus for generating a steering assist force by a hydraulic pressure generated by a pump driven by an electric motor. The apparatus includes: a steering torque detecting mechanism (13) for detecting a steering torque; a steering urgency level calculating section (S5) for calculating a steering urgency level by using a time-based second-order differential value of the steering torque detected by the steering torque detecting mechanism; a target speed determining section (31, S6, S7) for determining, on the basis of the steering urgency level calculated by the steering urgency level calculating section, an assist starting speed as an initial target speed at which the electric motor (M) is actuated; and a control section (31) for controlling driving of the electric motor to equate the speed of the electric motor to the target speed determined by the target speed determining section.

7 Claims, 7 Drawing Sheets

F I G. 4
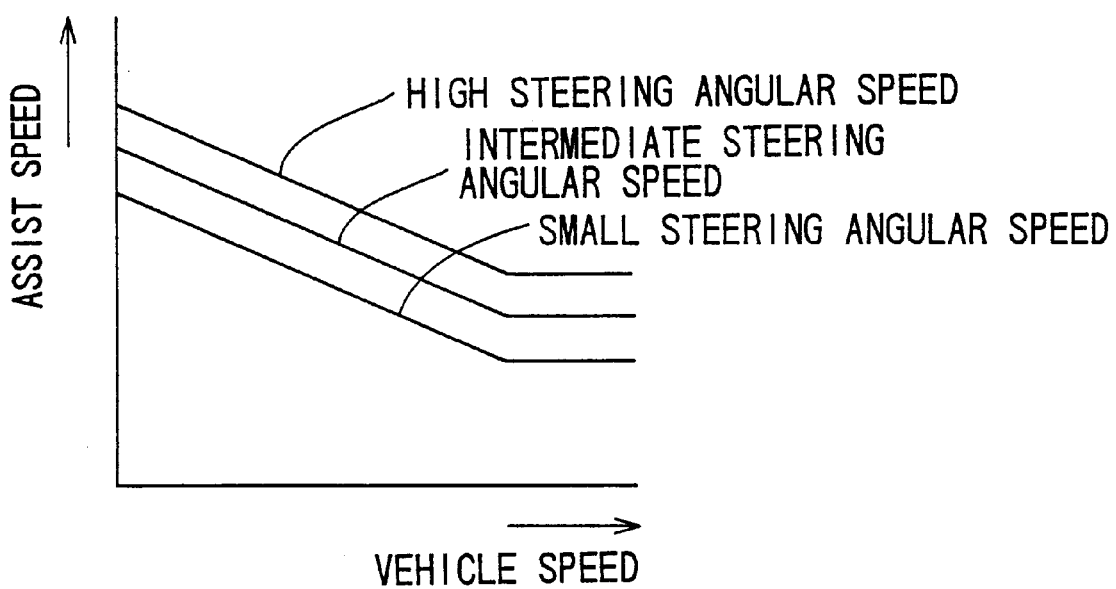

POWER STEERING DEVICE

TECHNICAL FIELD

The present invention relates to a power steering apparatus which applies a steering assist force to a steering mechanism by a hydraulic pressure generated by a pump driven by an electric motor.

BACKGROUND ART

Power steering apparatuses are conventionally utilized which assist operation of a steering wheel by supplying a working oil from an oil pump to a power cylinder coupled to a steering mechanism. The oil pump is driven by an electric motor, and a steering assist force is generated by the power cylinder in accordance with the speed of the electric motor. Since the steering assist force is not required when the steering is not turned, a so-called "stop-and-go control" is conducted, wherein the electric motor is off when the steering assumes a straight travel steering state virtually at a steering angle midpoint and, in response to detection of a steering angle change greater than a predetermined level, the electric motor is actuated.

During a several-millisecond period immediately after the actuation of the electric motor, the target speed of the electric motor is set at an assist starting speed that is greater than an assist speed which is a target speed corresponding to a required steering assist force. This suppresses a delay between the actuation of the electric motor and the generation of the required steering assist force.

As a more urgent steering operation is required, for example, for avoiding a forward obstacle, the delay in application of the steering assist force should be reduced. To this end, Japanese Patent Application No. 8-129060 (1996) (U.S. patent application Ser. No. 08/733,644) previously filed by the applicant proposes that the assist starting speed be determined in accordance with the steering speed.

Since it is impossible to accurately detect a steering urgency level and driver's intention on the basis of the steering speed alone, the arrangement according to the previous patent application cannot always properly determine the assist starting speed. When the steering wheel is suddenly turned at a lower steering urgency level immediately after the start of the steering operation, or when the steering wheel is operated relatively slowly at a higher steering urgency level immediately after the start of the steering operation, for example, the detection of the steering urgency level on the basis of the steering speed is liable to be erroneous.

Although the assist starting speed may be determined in accordance with the time-related change rate of a steering torque, the same problem as encountered by the steering-speed based control is unavoidable.

DISCLOSURE OF THE INVENTION

It is an object of the present invention to solve the aforesaid problem and to provide a power steering apparatus which is capable of determining an assist starting speed upon accurate reflection of a steering urgency level thereby to properly effecting steering assist.

The power steering apparatus of the present invention, which is adapted to generate a steering assist force by a hydraulic pressure generated by a pump driven by an electric motor, comprises: steering torque detecting means (corresponding to torque sensor 13 in FIG. 1) for detecting a steering torque; steering urgency level calculating means (corresponding to CPU 31 in FIG. 1 and Step S5 in FIG. 5) for calculating a steering urgency level by using a time-based second-order differential value of the steering torque detected by the steering torque detecting means; target speed determining means (corresponding to CPU 31 in FIG. 1 and Steps S6 and S7 in FIG. 5) including means for determining, on the basis of the steering urgency level calculated by the steering urgency level calculating means, an assist starting speed as an initial target speed at which the electric motor is actuated; and control means (corresponding to CPU 31 in FIG. 1) for controlling driving of the electric motor to equate the speed of the electric motor to the target speed determined by the target speed determining means.

With this arrangement, the time-based second-order differential value of the steering torque is used for the calculation of the steering urgency level, making it possible to determine an accurate urgency level. Since the assist starting speed can properly be determined upon accurate reflection of the steering urgency level, the steering assist can promptly be started when the urgency level is high. Further, when the urgency level is low, energy consumption can be reduced by reducing the assist starting speed to a lower level. Thus, the steering assist can properly be effected, while the energy saving is enhanced.

The steering urgency level calculating means may use a time-based first-order differential value of the steering torque as well as the time-based second-order differential value of the steering torque for calculation of the steering urgency level.

In accordance with a preferred embodiment of the present invention, the target speed determining means further includes: means (corresponding to CPU 31 in FIG. 1 and Step S8 in FIG. 5) for determining an assist speed as a target speed of the electric motor after a lapse of a predetermined time period from actuation of the electric motor; and limiter process means (corresponding to CPU 31 in FIG. 1 and Step S9 in FIG. 5) for limiting a change amount of the target speed per unit time to not greater than a predetermined limiter level when the target speed is changed from the assist starting speed to the assist speed.

With this arrangement, when the target speed of the electric motor is changed from the assist starting speed to the assist speed, the operation of the limiter process means prevents an abrupt change in the target speed. This suppresses an abrupt change in the steering assist force to improve the steering feeling.

The foregoing and other objects, features and effects of the present invention will become more apparent from the following description of the embodiment with reference to the attached drawings.

BRIEF DESCRIPTION OF THE DRAWINGS

FIG. 4 is a diagram showing an exemplary setting of an assist speed based on a vehicle speed and a steering angular speed;

EMBODIMENT OF THE INVENTION

Figure 1:
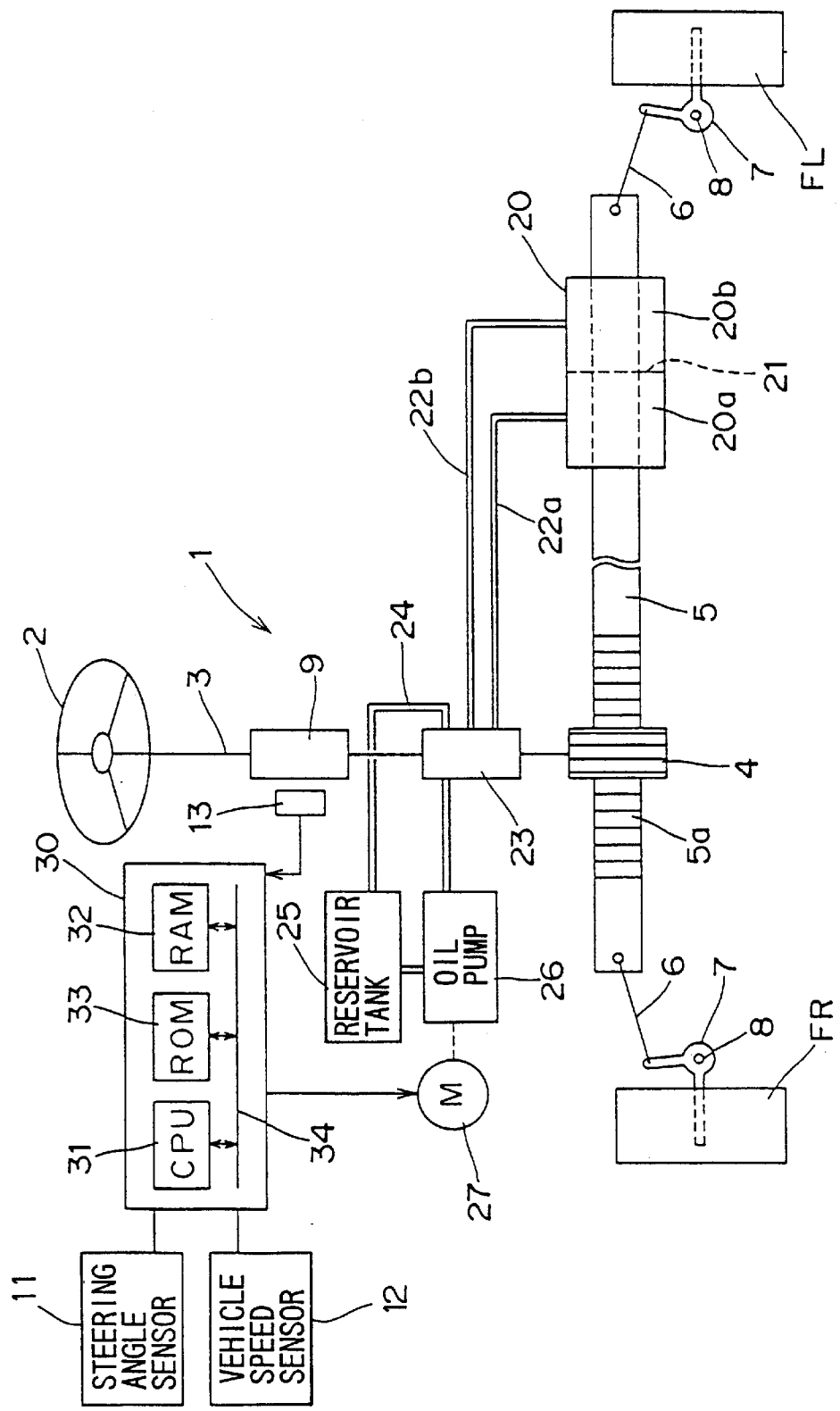
FIG. 1 is a conceptual diagram illustrating a basic construction of a power steering apparatus according to one embodiment of the present invention.

FIG. 1 is a conceptual diagram illustrating a basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are provided in midportions of the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the cylinder 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by a motor 27, so that a working oil contained in the reservoir tank 25 is pumped up and supplied to the oil control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

An exemplary construction of the hydraulic pressure control valve is disclosed in detail, for example, in Japanese Unexamined Patent Publication No. 59-118577 (1984) and U.S. patent application Ser. No. 08/733,644, the disclosure of which is incorporated herein by reference.

When the working oil is supplied to either one of the cylinder chambers of the power cylinder 20, the piston 21 moves transversely of the motor vehicle. Thus, a steering assist force acts on the rack shaft 5.

A voltage to be applied to the electric motor 27 for operation of the oil pump 26 is controlled so as to rotate the electric motor 27 at a predetermined assist speed, whereby the magnitude of the steering assist force is changed in accordance with a change in the valve aperture of the hydraulic pressure control valve 23. The electric motor 27 is controlled by an electronic control unit 30. The electronic control unit 30 determines the voltage to be applied to the motor 27 on the basis of an output signal of a steering angle sensor 11 for detecting the steering angle of the steering wheel 2, an output signal of a vehicle speed sensor 12 for detecting the speed of the vehicle and an output signal of a torque sensor 13 for detecting the direction and magnitude of a torque applied to the torsion bar 9. Thus, the steering assist force is applied to the steering mechanism 1 in accordance with the steering angle, the vehicle speed and the steering torque. The vehicle speed sensor 12 may be adapted to directly detect the vehicle speed or, alternatively, adapted to calculate the vehicle speed on the basis of an output pulse of a wheel speed sensor provided in association with the wheels.

The electronic control unit 30 includes a CPU 31, a RAM 32 which provides a work area for the CPU 31, a ROM 33 storing therein operation programs for the CPU 31, and buse 34 interconnecting these components.

The CPU 31 operates in accordance with the operation programs stored in the ROM 33, and controls the voltage to be applied to the electric motor 27 so that a proper steering assist force can be applied to the steering mechanism 1 in accordance with the steering angle, the vehicle speed and the steering torque. More specifically, the CPU 31 determines a target speed, and controls the driving of the electric motor 27 so as to equate the speed of the electric motor 27 to the determined target speed.

Figure 2:
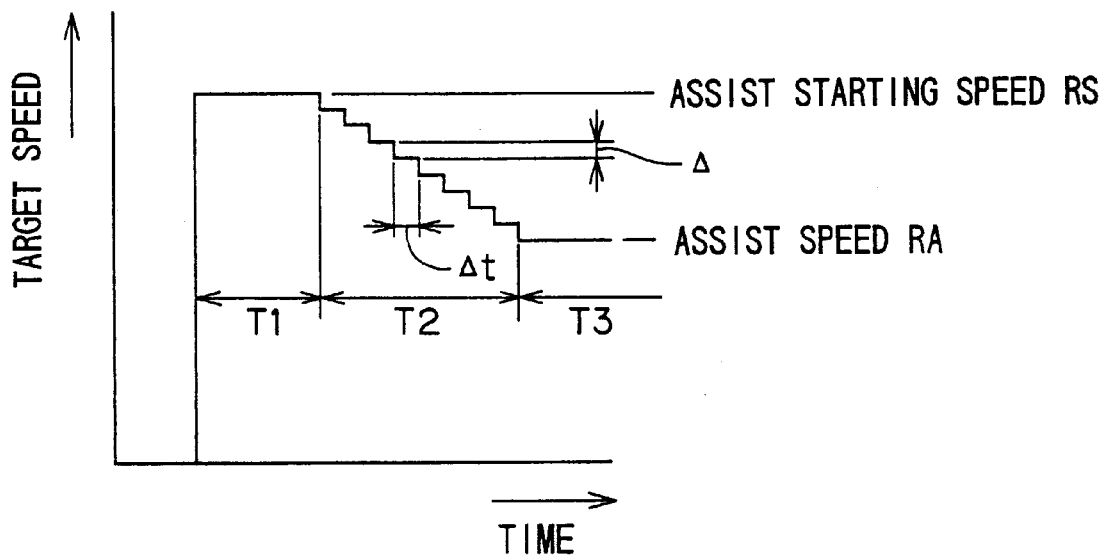
FIG. 2 is a diagram showing a time-related change in a target speed.

FIG. 2 is a diagram showing a time-related change in the target speed of the electric motor 27. The CPU 31 actuates the electric motor 27, if a predetermined actuation condition such that the steering angle detected by the steering angle sensor 11 is not less than a predetermined threshold value is satisfied. During a period T1 immediately after the actuation of the electric motor 27, the CPU 31 sets the target speed of the electric motor 27 at an assist starting speed RS (e.g., 5500 speed at the highest) that is greater than an assist speed RA which is a target speed required for providing a necessary steering assist force. During a subsequent period T2, the CPU 31 reduces the target speed stepwise and, during a subsequent period T3, keeps the target speed at the assist speed RA (e.g., 2800 speed at the lowest). The delay in the application of the steering assist can be prevented by thus setting the target speed at the assist starting speed RS immediately after the actuation of the electric motor 27.

During the period T2, a reduction in the speed observed on a predetermined process cycle At (e.g., 0.5 millisecond) is limited to A (e.g., 20 speed). That is, a limiter process is performed, so that the steering assist force is not abruptly changed. Therefore, where a steering torque is continuously applied to the steering wheel 2 when the motor vehicle travels along a long curve, for example, the heaviness of the steering wheel 2 is not abruptly changed. Thus, the steering feeling is improved.

Figure 3:
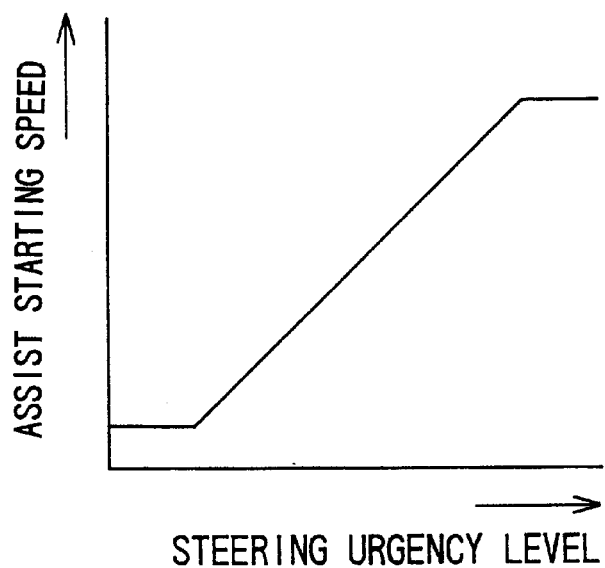
FIG. 3 is a diagram showing an exemplary setting of an assist starting speed based on a steering urgency level.

FIG. 3 is a diagram for explaining how to determine the assist starting speed. The CPU 31 changes the assist starting speed RS in accordance with a steering urgency level. More specifically, the higher the steering urgency level, the greater the assist starting speed RS. Where the steering urgency level is high, for example, in a quick steering operation, a required steering assist force is immediately generated. Therefore, the steering feeling can be improved, and the steering assist can properly be provided. Further, where the steering urgency level is low, the assist starting speed RS is set at a relatively low level, so that the energy saving is enhanced.

In this embodiment, the steering urgency level is determined on the basis of a time-based first-order differential value of the steering torque and a time-based second-order differential value of the steering torque, which will be described later in detail.

FIG. 4 is a diagram for explaining how to determine the assist speed. The CPU 31 changes the assist speed RA on the basic of a steering angular speed obtained by calculating a time-related change rate of steering angle data applied from the steering angle sensor 11, and vehicle speed data obtained from the vehicle speed sensor 12. More specifically, as the vehicle speed becomes higher, the assist speed RA is set lower. This is because a larger steering assist force is required at lower speed traveling and a smaller steering assist force is required at higher speed traveling. The CPU 31 sets the assist speed RA at a higher level, as the steering angular speed becomes higher. This is because a greater steering assist force is required as the steering angular speed becomes higher.

By thus setting the assist speed RA, a necessary and sufficient electric power is supplied to the electric motor 27 in accordance with the vehicle speed and the steering angular speed, so that the energy saving is enhanced.

Figure 5:
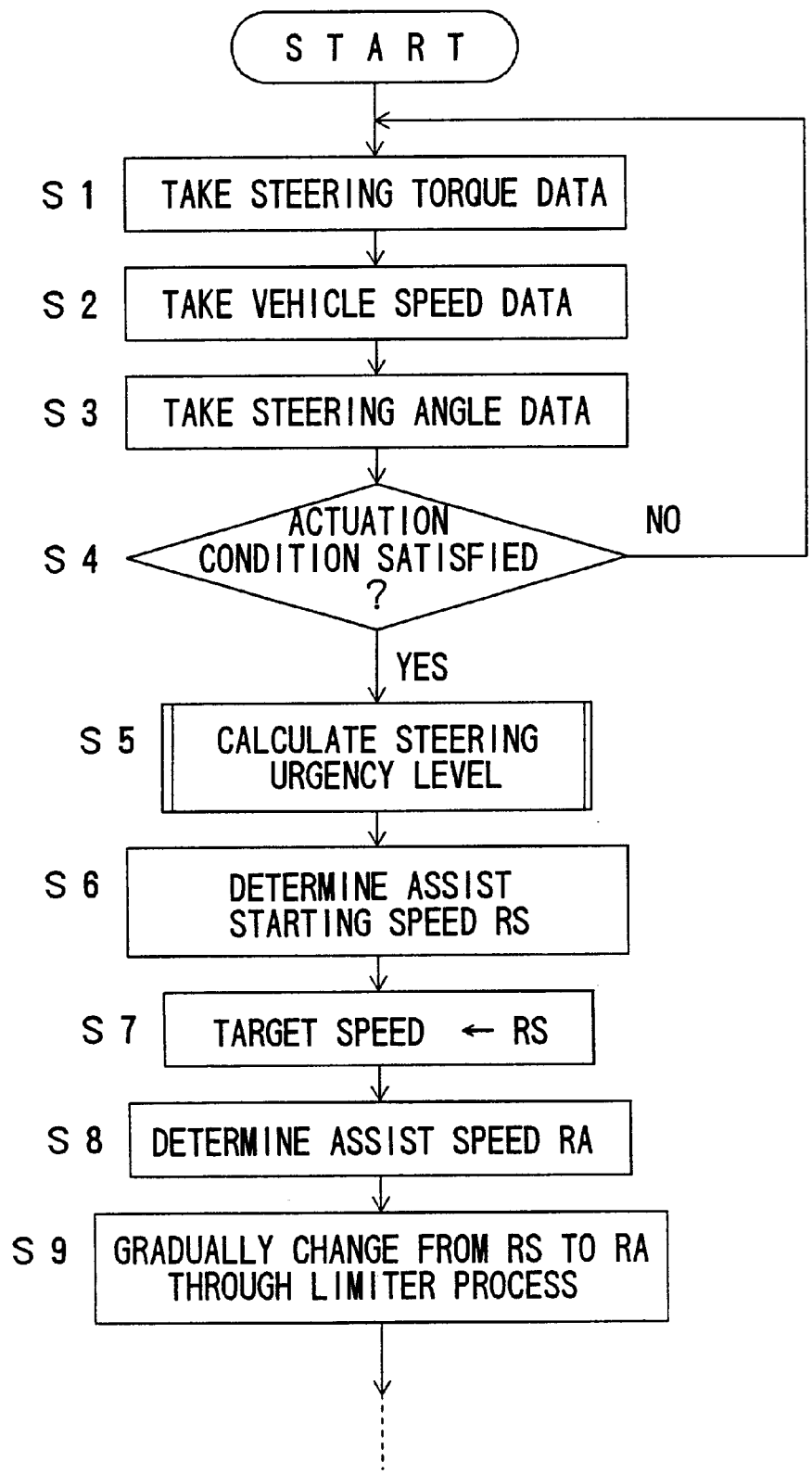
FIG. 5 is a flow chart illustrating a process flow for drive control of an electric motor.

FIG. 5 is a flow chart illustrating a process flow for controlling the electric motor 27 by the CPU 31. The CPU 31 acquires steering torque data from the torque sensor 13 (Step S1), acquires vehicle speed data from the vehicle speed sensor 12 (Step S2), acquires steering angle data from the steering angle sensor 11 (Step S3), and determines whether or not the predetermined actuation condition for actuating the electric motor 27 is satisfied (Step S4). If the actuation condition is not satisfied, the CPU 31 continuously monitors the data from the sensors 11 to 13.

If the actuation condition is satisfied, the CPU 31 calculates a steering urgency level (Step S5). Then, the CPU 31 determines the assist starting speed RS on the basis of the calculated steering urgency level (Step S6), sets the target speed at the assist starting speed RS (Step S7), and controls the driving of the electric motor 27 so that the speed of the electric motor 27 is equated to this target speed.

Subsequently, an assist speed RA is calculated on the basis of the steering angular speed determined as the time-related change rate of the steering angle data and the vehicle speed (Step S8). After a lapse of a predetermined time period T1 (several milliseconds) from a time point at which the target speed is set at the assist starting speed RS, the target speed is gradually decreased from the assist starting speed RS to the assist speed RA, while the limiter process is performed (Step S9).

If a predetermined condition such that the steering angle detected by the steering angle sensor 11 is kept virtually at a steering angle midpoint for more than a predetermined time period is thereafter satisfied, the electric motor 27 is stopped. After the stop of the electric motor 27, the process sequence from Step S1 is carried out.

An explanation will next be given to an exemplary operation to be performed in Step S5 of FIG. 5, i.e., a steering urgency level calculating operation.

The principle of the detection of the steering urgency level will first be described.

Through an experiment using a motor vehicle equipped with the electric power steering apparatus, a relationship was determined which existed between the steering urgency level and the change amount of the steering torque within a predetermined time period (the time-based first-order differential value of the steering torque) after the start of the steering operation when the motor vehicle made a lane change. The results of the experiment are shown in FIG. 6.

Figure 6:
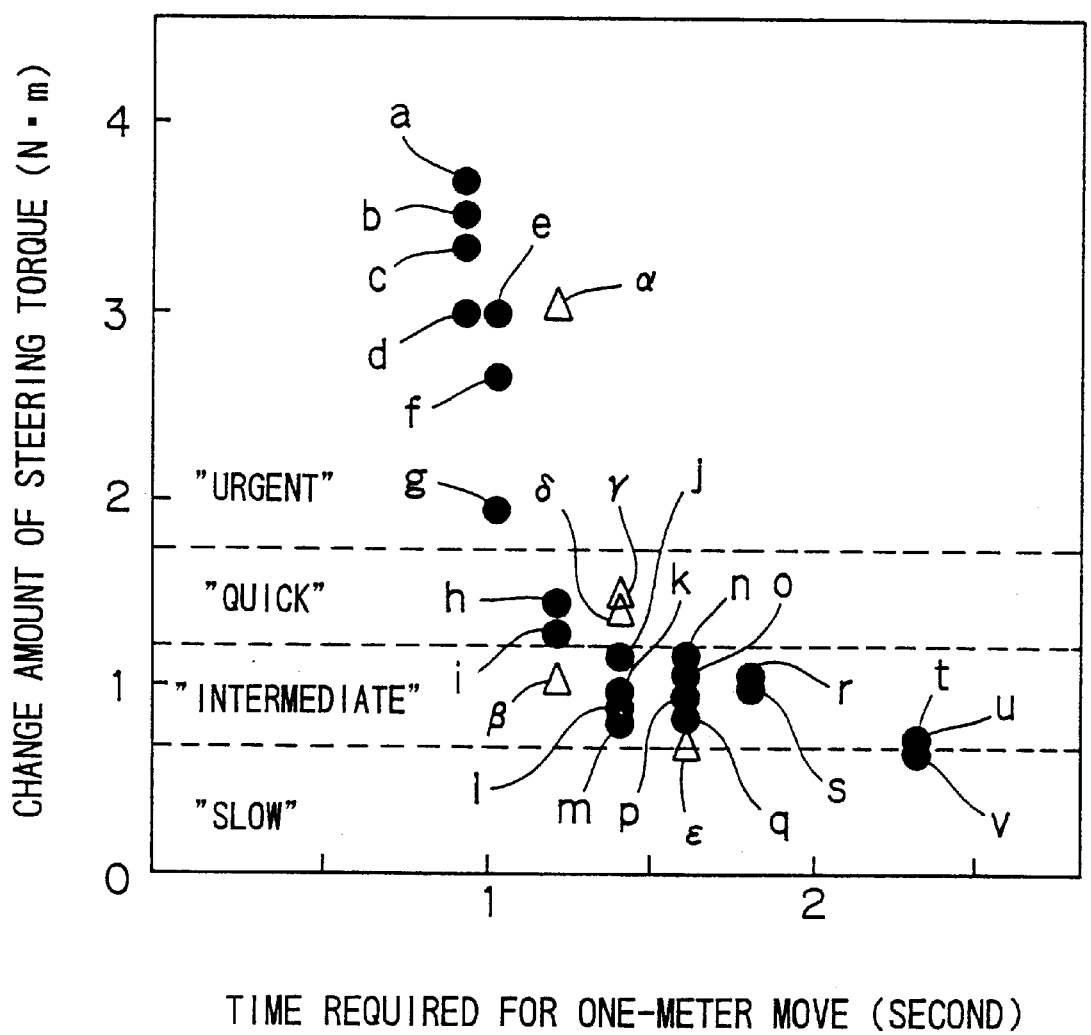
FIG. 6 is a diagram showing a relationship between the time-related change amount of a steering torque and a steering urgency level.

The abscissa in FIG. 6 represents a time (second) required for the motor vehicle to initially move for a lateral distance of one meter when the vehicle made the lane change at a speed of 50 km/hour by moving for a lateral distance of 3.5 m. The shorter the required time, the higher the urgency level.

The ordinate in FIG. 6 represents the change amount (N·m) of the steering torque detected by the torque sensor 13 within the predetermined time period (0.1 second) after the start of the steering operation. The steering torque changes before the steering turning angles of the wheels are actually changed. As will be described later, the predetermined time period is preferably set as short as possible within a range in which the change amount of the steering torque within the time period after the start of the steering operation can be correlated with the steering urgency level when a standard steering operation is performed.

In FIG. 6, data of the experiment results are plotted at ● and Δ. The data a to v plotted at δ indicate the results obtained when the standard steering operation was performed. The data α to ε plotted at Δ indicate the results obtained when a non-standard steering operation was performed. The standard steering operation herein means such a natural steering operation that the steering speed is not intentionally changed during a period from the start to the end of the lane change. The non-standard steering operation herein means such a steering operation that the steering speed is intentionally changed at the beginning of the lane change.

It is confirmed from the standard steering data a to v shown in FIG. 6 that, when the standard steering operation was performed at the lane change, a certain correlation existed between the change amount of the steering torque within the predetermined time period after the start of the steering operation and the steering urgency level.

In this experiment, the steering urgency level was determined on a scale of four levels. More specifically, the data a to g fell in the highest urgency level "URGENT", the data h and i fell in the second highest urgency level "QUICK", the data j to s fell in the third highest urgency level "INTERMEDIATE", and the data t to v fell on a boundary between "INTERMEDIATE" and the lowest urgency level "SLOW".

It is confirmed from the non-standard steering data α to ε shown in FIG. 6 that, when the non-standard steering operation was performed at the lane change, no correlation existed between the steering urgency level and the change amount of the steering torque within the predetermined time period after the start of the steering operation.

More specifically, the data α, which was to fall in the urgency level "QUICK" on the basis of the time required for the lane change, actually fell in "URGENT" on the basis of the change amount of the steering torque within the predetermined time period after the start of the steering operation, because the steering operation was intentionally abruptly performed only immediately after the beginning of the lane change.

The data β, which was to fall in the urgency level "QUICK" on the basis of the time required for the lane change, actually fell in "INTERMEDIATE" on the basis of the change amount of the steering torque within the predetermined time period after the start of the steering operation, because the steering operation was intentionally performed at a normal speed only immediately after the beginning of the lane change.

The data γ and δ, which were to fall in the urgency level "INTERMEDIATE" on the basis of the time required for the lane change, actually fell in "QUICK" on the basis of the change amount of the steering torque within the predetermined time period after the start of the steering operation, because the steering operation was intentionally performed relatively quickly only immediately after the beginning of the lane change.

The data ε, which was to fall in the urgency level "INTERMEDIATE" on the basis of the time required for the lane change, actually fell on the boundary between "INTERMEDIATE" and "SLOW" on the basis of the change amount of the steering torque within the predetermined time period after -the start of the steering operation, because the steering operation was intentionally performed relatively slowly only immediately after the beginning of the lane change.

Figure 7:
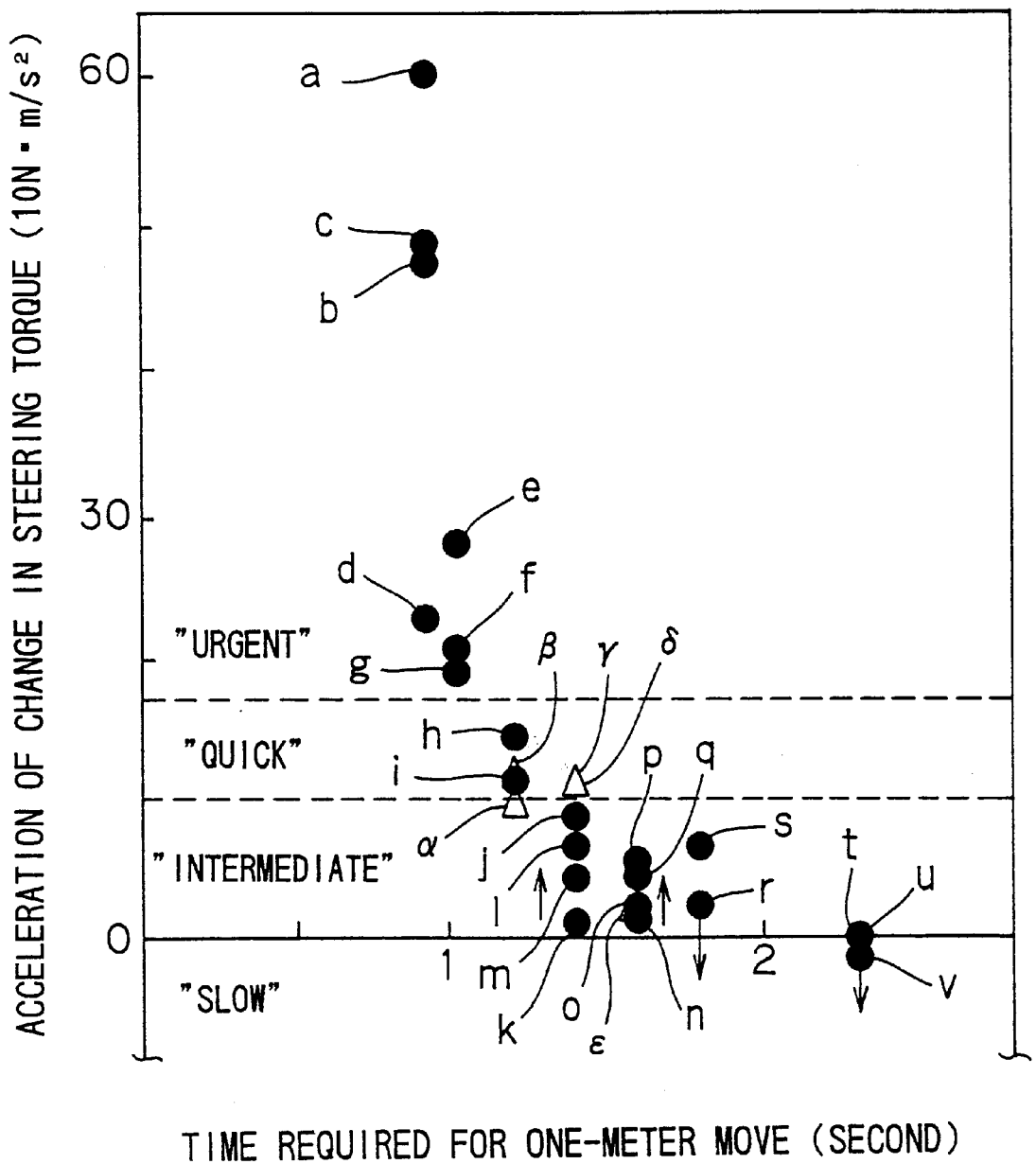
FIG. 7 is a diagram showing a relationship between the acceleration of the change in the steering torque and the steering urgency level.

Next, through an experiment using a motor vehicle equipped with the electric power steering apparatus, a relationship was determined which existed between the steering urgency level and the acceleration of the change in the steering torque at a time point after a lapse of a predetermined time period (0.1 second) from the start of the steering operation (corresponding to a time-based second-order differential value of the steering torque) when the motor vehicle made a lane change. The results of the experiment are shown in FIG. 7. Data of the experiment results shown in FIG. 7 correspond to the data of the experiment results shown in FIG. 6.

The abscissa in FIG. 7 represents a time required for the motor vehicle to initially move for a lateral distance of one meter when the vehicle made the lane change at a speed of 50 km/hour by moving for a lateral distance of 3.5 m. The ordinate in FIG. 7 represents the acceleration (N·m/s$^2$) of the change in the steering torque at the time point after a lapse of 0.1 second from the start of the steering operation.

In FIG. 7, data of the experiment results are plotted at ● and Δ for the standard steering operation and the nonstandard steering operation, respectively, and the data a to v and α to ε correspond to those shown in FIG. 6.

It is confirmed from the standard steering data a to v shown in FIG. 7 that, when the standard steering operation was performed at the lane change, a certain correlation existed between the steering urgency level and the acceleration of the change in the steering torque.

More specifically, the data a to g fell in the highest urgency level "URGENT", the data h and i fell in the second highest urgency level "QUICK", the data j to s fell in the third highest urgency level "INTERMEDIATE", and the data t to v fell on a boundary between "INTERMEDIATE" and the lowest urgency level "SLOW". On the boundary between the urgency levels "INTERMEDIATE" and "SLOW", the acceleration of the change is zero.

On the other hand, it is confirmed from the non-standard steering data α to ε shown in FIG. 7 that, when the non-standard steering operation was performed at the lane change, the steering urgency level and the acceleration of the change in the steering torque were not necessarily correlated with each other.

More specifically, the data α, which was to fall in the urgency level "QUICK" on the basis of the time required for the lane change, actually fell on a boundary between the urgency levels "QUICK" and "INTERMEDIATE" on the basis of the acceleration of the change, because the steering operation was intentionally abruptly performed only immediately after the beginning of the lane change. Since the data a fell in the urgency level "URGENT" on the basis of the change amount of the steering torque within the predetermined time period after the start of the steering operation, the urgency level based on the acceleration of the change in the steering torque was lower than the urgency level based on the change amount of the steering torque.

The data β, which was to fall in the urgency level "QUICK" on the basis of the time required for the lane change, actually fell in the urgency level "QUICK" on the basis of the acceleration of the change in the steering torque, though the steering operation was intentionally performed at a normal speed only immediately after the beginning of the lane change. Since the data β fell in the urgency level "INTERMEDIATE" on the basis of the change amount of the steering torque within the predetermined time period after the start of the steering operation, the urgency level based on the acceleration of the change in the steering torque was higher than the urgency level based on the change amount of the steering torque.

The data γ and δ, which were to fall in the urgency level "INTERMEDIATE" on the basis of the time required for the lane change, actually fell around the boundary between the urgency levels "INTERMEDIATE" and "QUICK" on the basis of the acceleration of the change in the steering torque, because the steering operation was intentionally performed relatively quickly only immediately after the beginning of the lane change. Since the data γ and δ fell in the urgency level "QUICK" on the basis of the change amount of the steering torque within the predetermined time period after the start of the steering operation, the urgency level based on the acceleration of the change in the steering torque was lower than the urgency level based on the change amount of the steering torque.

The data ε, which was to fall in the urgency level "INTERMEDIATE" on the basis of the time required for the lane change, actually fell in the urgency level "INTERMEDIATE" on the basis of the acceleration of the change in the steering torque, though the steering operation was intentionally performed relatively slowly only immediately after the beginning of the lane change. Since the data ε fell on the boundary between the urgency levels "INTERMEDIATE" and "SLOW" on the basis of the change amount of the steering torque within the predetermined time period after the start of the steering operation, the urgency level based on the acceleration of the change in the steering torque was higher than the urgency level based on the change amount of the steering torque.

As for the data k, o, n, ε, r, t, u, v which fell around the boundary between the urgency levels "INTERMEDIATE" and "SLOW" on the basis of the acceleration of the change in the steering torque, steering torques at a time point after a lapse of another predetermined time period (0.4 second) plus the aforesaid predetermined time period (0.1 second) from the start of the steering operation were each calculated in consideration of the change rate of the acceleration of the change in the steering torque (time-based differential value of the acceleration of the change in the steering torque). The another predetermined time period is preferably set as short as possible within a range in which the urgency levels of the data k, o, n, ϵ, r, t, u, v can be discriminated as follows.

In comparison of the results of the calculation with the steering torques at the time point after a lapse of 0.1 second from the start of the steering operation, the data k, o, n, ϵ which had higher urgency levels on the basis of the time required for the lane change each had an increased steering torque as indicated by arrows in FIG. 7, and the data r, t, u, v which had lower urgency levels on the basis of the time required for the lane change each had a decreased steering torque as indicated by arrows in FIG. 7.

Where a steering urgency level falls on or around a boundary between two urgency levels, the steering urgency level is higher when a steering torque at the time point after a lapse of the predetermined time period from the start of the steering operation is thereafter increased than when the steering torque is thereafter decreased. An urgency level boundary range in which the aforesaid relationship is satisfied is defined around the boundary between the steering urgency levels, and is determined as specific deviation ranges from the boundary through an experiment.

Thus, the steering urgency level can be determined on the basis of the change amount of the steering torque within the predetermined time period from the start of the steering operation (time-based first-order differential value of the steering torque), the acceleration of the change in the steering torque at the time point after a lapse of the predetermined time period (time-based second-order differential value of the steering torque) and whether the steering torque increases or decreases within the another predetermined time period subsequent to the time point after a lapse of the predetermined time period from the start of the steering operation. Therefore, if a table indicative of the urgency levels based on the change amount of the steering torque and a table indicative of the urgency levels based on the acceleration of the change in the steering torque are preliminarily stored in the ROM 33 as storage means, the steering urgency level can be determined on the basis of the change amount of the steering torque and the acceleration of the change in the steering torque.

Figure 8:
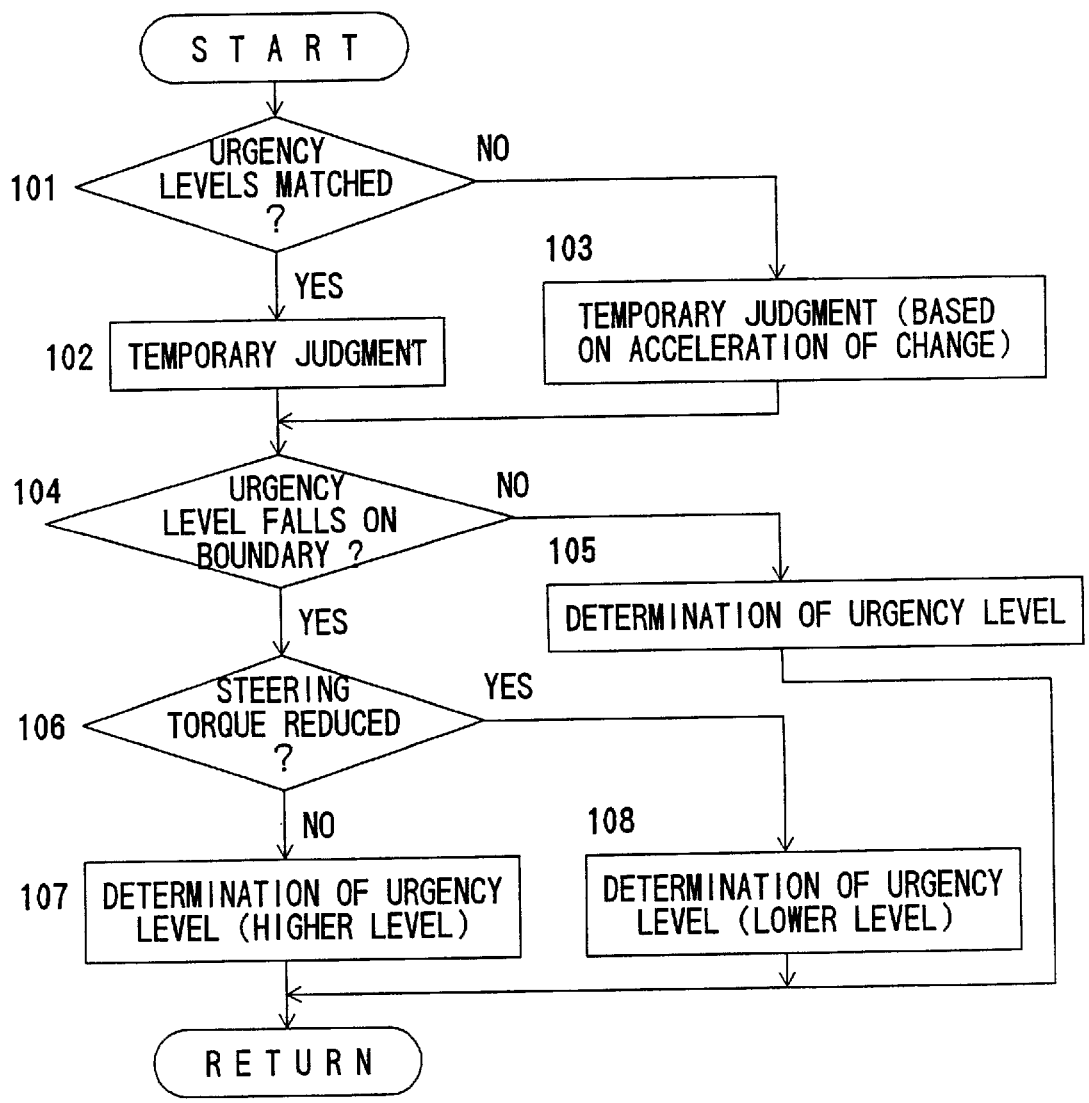
FIG. 8 is a flow chart illustrating a process flow for determining the steering urgency level on the basis of the time-related change amount of the steering torque and the acceleration of the change in the steering torque.

FIG. 8 is a flow chart illustrating the steering urgency level determining operation.

It is first judged whether or not an urgency level based on the change amount of a steering torque within the predetermined time period from the start of the steering operation matches with an urgency level based on the acceleration of the change in the steering torque at a time point after a lapse of the predetermined time period (Step 101).

For the judgment, the CPU 31 calculates a difference between a steering torque at the start of the steering operation and a steering torque after a lapse of the predetermined time period on the basis of steering torque inputs chronologically taken from the torque sensor 13 during the predetermined time period to determine the change amount of the steering torque, and calculates the acceleration of the change in the steering torque which corresponds to a second-order differential value of the steering torque at the time point after a lapse of the predetermined time period.

As a result of the judgment, if the urgency levels match with each other, the urgency level is employed as a temporary judgment result (Step 102), and if the urgency levels do not match with each other, the urgency level based on the acceleration of the change is employed as a temporary judgment result (Step 103).

It is next judged whether or not the urgency level of the temporary judgment result falls on or around the boundary between two urgency levels (Step 104).

As a result of the judgment, if the urgency level of the temporary judgment result does not fall on or around the boundary between the two urgency levels, the urgency level of the temporary judgment result is employed as a final judgment result (Step 105).

As a result of the judgment, if the urgency level of the temporary judgment result falls on or around the boundary between the two urgency levels, it is judged whether or not a steering torque at the time point after a lapse of the predetermined time period (e.g., 0.1 second) from the start of the steering operation decreases within the subsequent predetermined time period (e.g., 0.4 second) (Step 106).

For the judgment, the CPU 31 determines the steering torque at the time point after a lapse of the predetermined time period (e.g., 0.1 second) from the start of the steering operation on the basis of the steering torque inputs chronologically taken during the predetermined time period (e.g., 0.1 second) after the start of the steering operation, and calculates a steering torque at a time point after a lapse of the subsequent predetermined time period (e.g., 0.4 second) on the basis of the change rate of the acceleration of the change in the steering torque at the time point after a lapse of the predetermined time period (e.g., 0.1 second) from the start of the steering operation.

As a result of the judgment, if the steering torque does not decrease within the subsequent predetermined time period, the higher one of the two urgency levels is employed as a judgment result (Step 107), and if the steering torque decreases within the subsequent predetermined time period, the lower one of the two urgency levels is employed as a judgment result (Step 108).

In accordance with this embodiment, the steering urgency level is thus determined by using not only the first-order differential value of the steering torque but also the second-order differential value of the steering torque, so that the steering urgency level can accurately be detected. Since the assist starting speed RS is determined in accordance with the steering urgency level thus accurately detected, a steering assist force can immediately be generated when the urgency level is high. When the urgency level is low, the assist starting speed RS is set lower, whereby the energy consumption can be reduced.

While one embodiment of the present invention has thus been described, it should be understood that the present invention can be embodied in any other forms, and various design modifications can be made within the scope of the present invention as set forth in the claims.

Industrial Applicability of the Invention

The power steering apparatus according to the present invention is used for applying a steering assist force to a steering mechanism of a motor vehicle.

What is claimed is:

1. A power steering apparatus for generating a steering assist force by a hydraulic pressure generated by a pump driven by an electric motor, comprising:

steering torque detecting means for detecting a steering torque;

steering urgency level calculating means for calculating a steering urgency level on the basis of a time-based second-order differential value of the steering torque detected by the steering torque detecting means;

target speed determining means including means for determining, on the basis of the steering urgency level calculated by the steering urgency level calculating means, an assist starting speed as an initial target speed at which the electric motor is actuated; and control means for controlling driving of the electric motor to equate the speed of the electric motor to the target speed determined by the target speed determining means.

2. A power steering apparatus as set forth in claim 1, wherein the steering urgency level calculating means calculates the steering urgency level also on the basis of an increase or decrease of a steering torque detected by the steering torque detecting means at a predetermined time interval after start of a steering operation.

3. A power steering apparatus as set forth in claim 1, wherein the steering urgency level calculating means calculates the steering urgency level also on the basis of a time-based first-order differential value of the steering torque detected by the steering torque detecting means.

4. A power steering apparatus as set forth in claim 3, wherein the steering urgency level calculating means calculates the steering urgency level also on the basis of an increase or decrease of a steering torque detected by the torque detecting means at a predetermined time interval after start of a steering operation.

5. A power steering apparatus as set forth in claim 1, wherein the target speed determining means further includes:

means for determining an assist speed as a target speed of the electric motor after a lapse of a predetermined time period from actuation of the electric motor; and limiter process means for limiting a change amount of the target speed per unit time to not greater than a predetermined limiter level when the target speed is changed from the assist starting speed to the assist speed.

6. A power steering apparatus as set forth in claim 2, wherein the steering urgency level calculating means calculates the steering urgency level also on the basis of a time-based first-order differential value of the steering torque detected by the steering torque detecting means.

7. A power steering apparatus as set forth in claim 5, wherein the steering urgency level calculating means calculates the steering urgency level also on the basis of an increase or decrease of a steering torque detected by the torque detecting means at a predetermined time interval after start of a steering operation.

* * * * *